US012648567B2

(12) United States Patent
Frodyma

(10) Patent No.: US 12,648,567 B2
(45) Date of Patent: Jun. 9, 2026

(54) MICROBIAL COMPOSITIONS

(71) Applicant: NewLeaf Symbiotics, Inc., St. Louis, MO (US)

(72) Inventor: Michael E. Frodyma, St. Louis, MO (US)

(73) Assignee: NewLeaf Symbiotics, Inc., St. Louis, MO (US)

( * ) Notice: Subject to any disclaimer, the term of this patent is extended or adjusted under 35 U.S.C. 154(b) by 1130 days.

(21) Appl. No.: 17/625,451

(22) PCT Filed: Jul. 10, 2020

(86) PCT No.: PCT/US2020/041604
§ 371 (c)(1),
(2) Date: Jan. 7, 2022

(87) PCT Pub. No.: WO2021/007516
PCT Pub. Date: Jan. 14, 2021

(65) Prior Publication Data
US 2022/0312772 A1      Oct. 6, 2022

Related U.S. Application Data

(60) Provisional application No. 62/873,079, filed on Jul. 11, 2019.

(51) Int. Cl.
*A01N 63/20* (2020.01)
*A01N 25/28* (2006.01)
*A01P 21/00* (2006.01)

(52) U.S. Cl.
CPC ............. *A01N 63/20* (2020.01); *A01N 25/28* (2013.01); *A01P 21/00* (2021.08)

(58) Field of Classification Search
CPC .... A01N 63/20; A01N 25/28; C12R 2001/01; C12N 1/04
See application file for complete search history.

(56) References Cited

U.S. PATENT DOCUMENTS

| | | |
|---|---|---|
| 6,474,573 B1 | 11/2002 | Kelly |
| 6,949,715 B2 | 9/2005 | Kelly |
| 6,964,385 B2 | 11/2005 | Kelly |
| 6,984,404 B1 | 1/2006 | Talton et al. |
| 7,455,250 B2 | 11/2008 | Muljono |
| 7,550,154 B2 | 6/2009 | Saltzman et al. |
| 7,935,390 B2 | 5/2011 | Muljono |
| 8,034,450 B2 | 10/2011 | Curtis et al. |
| 8,286,898 B2 | 10/2012 | Muljono |
| 8,939,388 B1 | 1/2015 | Beetz et al. |
| 9,332,776 B1 | 5/2016 | Beetz et al. |
| 9,551,527 B2 | 1/2017 | Beetz et al. |
| 9,861,945 B1 | 1/2018 | Beetz et al. |
| 9,962,720 B2 | 5/2018 | St. Peter et al. |
| 9,993,787 B1 | 6/2018 | Beetz et al. |
| 10,155,234 B1 | 12/2018 | Beetz et al. |

| | | |
|---|---|---|
| 10,252,181 B2 | 4/2019 | Beetz et al. |
| 10,279,359 B2 | 5/2019 | Ackerman et al. |
| 10,286,411 B2 | 5/2019 | Ackerman et al. |
| 10,399,098 B2 | 9/2019 | Bright et al. |
| 10,486,173 B2 | 11/2019 | Beetz et al. |
| 10,543,495 B2 | 1/2020 | Ackerman et al. |
| 10,569,244 B2 | 2/2020 | Beetz et al. |
| 10,864,457 B2 | 12/2020 | Madsen et al. |
| 11,033,914 B2 | 6/2021 | Ackerman et al. |
| 2006/0071357 A1 | 4/2006 | Pilon et al. |
| 2016/0295868 A1 | 10/2016 | Jones et al. |
| 2016/0302423 A1 | 10/2016 | Jones et al. |
| 2017/0189921 A1 | 7/2017 | Ackerman et al. |
| 2017/0333861 A1 | 11/2017 | Friesen et al. |
| 2019/0038994 A1 | 2/2019 | Beetz et al. |

FOREIGN PATENT DOCUMENTS

| | | | |
|---|---|---|---|
| CN | 1310016 | * | 8/2001 |
| WO | 03/072262 A1 | | 9/2003 |
| WO | 2006/047453 A2 | | 5/2006 |
| WO | 2007/056098 A2 | | 5/2007 |
| WO | 2007/092288 A2 | | 8/2007 |
| WO | WO201202193 | * | 2/2012 |
| WO | 2013148258 A1 | | 10/2013 |
| WO | 2015/042504 A1 | | 3/2015 |
| WO | 2015/196110 A1 | | 12/2015 |
| WO | 2018/098376 A1 | | 5/2018 |

OTHER PUBLICATIONS

Yang, CN 1310016; published: Aug. 29, 2001, english machine translation obtained on Nov. 26, 2024. (Year: 2024).*
Labran et al. (Innovative Food Science & Emerging Technologies, 39, Feb. 2017, 216-222). (Year: 2017).*
Jayaprakash, Preethi et al., Encapsulation of bioactive compounds using competitive emerging techniques: Electrospraying, nano spray drying, and electrostatic spray drying, Journal of Food Engineering 339 (2023) 111260, 11 pages.
Jiang, Tian et al., Electrostatic spray drying microencapsulated Bifidobacterium lactis BL03, Food and Fermentation Industries, 2021, 47(7) pp. 27-33.
Strobel, Scott A. et al., Industrially-Scalable Microencapsulation of Plant Beneficial Bacteria in Dry Cross-Linked Alginate Matrix, Industrial Biotechnology, vol. 14, No. 3 (Jun. 2018) pp. 138-147.
Altschul, S.F., et al., "Basic Alignment Search Tool (BLAST)," 1990, J Mol Biol, 215/3:403-410, 8 pages.
Bentley, D.R., et al., "Accurate Whole Human Genome Sequencing using Reversible Terminator Chemistry," 2008, Nature, 456/7218:53-59, 7 pages.
Caporaso, J.G., et al., "Ultra-High-Throughput Microbial Community Analysis on the Illumina HiSeq and MiSeq Platforms," 2012, ISME J, 6/8:1621-1624, 4 pages.

(Continued)

*Primary Examiner* — Genevieve S Alley

(74) *Attorney, Agent, or Firm* — Stinson LLP

(57) ABSTRACT

Provided herein are various microbial compositions and methods for preparing these compositions.

14 Claims, No Drawings

(56) References Cited

OTHER PUBLICATIONS

Green, P.N., et al., "Review of the Genus Methylobacterium and Closely Related Organisms: a Proposal that Some Methylobacterium Species be Reclassified into a New Genus, Methylorubrum gen. nov.," 2018, Int J Systc Evol Microbiol, 68:2727-2748, 22 pages.

Konstantinidis, K.T., et al., "Genomic Insights that Advance the Species Definition for Prokaryotes," 2005, PNAS, 102/7:2567-2572, 6 pages.

Lidstrom, M.E. 2006. Aerobic Methylotrophic Prokaryotes. In Dworkin, M., S. Falkmv, E. Rosenberg, K-H. Schleifer, and E. Stackebrandt (eds.). "The Prokaryotes. A Handbook on the Biology of Bacteria. vol 2. Ecophysiology and Biochemistry." Third edition. Springer, New York, pp. 618-634, 66 pages.

Sanger, F., et al., "DNA Sequencing with Chain-Terminating Inhibitors," 1977, PNAS, 74/12:5463-5467, 5 pages.

Strobel, S.A. "Microencapsulation of Actives in Cross-linked Alginates Prepared by Spray-Drying" 2012 Doctoral Dissertation, University of California Davis, pp. 110-132, 24 pages.

Sy, A., et al., "Methylotrophic Methylobacterium Bacteria Nodulate and Fix Nitrogen in Symbiosis with Legumes," 2001, J Bacteriol, 183/1:214-220, 7 pages.

International Preliminary Report on Patentability issued in PCT/US2020/041604, dated Jan. 11, 2022, 6 pages.

International Search Report and Written Opinion issued in PCT/US2020/041604, dated Oct. 7, 2020, 13 pages.

* cited by examiner

MICROBIAL COMPOSITIONS

FIELD OF THE INVENTION

Provided herein are various microbial compositions and methods for preparing these compositions.

BACKGROUND

One-carbon organic compounds such as methane and methanol are found extensively in nature, and are utilized as carbon sources by bacteria classified as methanotrophs and methylotrophs. Methanotrophic bacteria include species in the genera *Methylobacter, Methylomonas, Methylomicrobium, Methylococcus, Methylosinus, Methylocystis, Methylosphaera, Methylocaldum*, and *Methylocella* (Lidstrom, 2006). Methanotrophs possess the enzyme methane monooxygenase, which incorporates an atom of oxygen from $O_2$ into methane, forming methanol. All methanotrophs are obligate one-carbon utilizers that are unable to use compounds containing carbon-carbon bonds. Methylotrophs, on the other hand, can also utilize more complex organic compounds, such as organic acids, higher alcohols, sugars, and the like. Thus, methylotrophic bacteria are facultative methylotrophs. *Methylobacterium* are found in soil, dust, fresh water, sediments, and leaf surfaces, as well as in industrial and clinical environments.

*Methylobacterium* strains that can be applied to a variety of crops including corn and soybean to improve yield have been reported in U.S. Patent Application Publication Nos. 20160295868 and 20160302423, respectively. There remains a need for improved microbial compositions, including microbial compositions that contain methanotrophs and/or methylotrophs, as well as methods for conveniently and economically producing these compositions.

BRIEF SUMMARY

Various microbial compositions are described herein. For example, in some embodiments, microbial compositions comprise encapsulated microbial particulates comprising an aggregate comprising a bacterium, such as a gram-negative bacterium (e.g., methanotrophs and/or methylotrophs), and a carrier encapsulating at least a portion of the microbial aggregate. In various embodiments, the microbial composition satisfies one of more of the following conditions: (a) the encapsulated microbial particulates are characterized by a particle size distribution where at least about 70%, at least about 80%, or at least about 90% of the particulates have a particle size from about 2 microns to about 250 microns; (b) the encapsulated microbial particulates are characterized by an average particle size of from about 1 microns to about 500 microns; or (c) the weight ratio of the carrier to the aggregate is from about 5:1 to about 75:1.

Various methods for preparing these microbial compositions are also described herein. For example, in various embodiments, the methods for preparing a microbial composition comprising encapsulated microbial particulates comprise atomizing a feed mixture comprising a gram-negative bacterium, a conductive carrier, and a solvent to form droplets of the feed mixture; electrostatically charging the droplets of the feed mixture to form a charged spray of the feed mixture wherein the conductive carrier and solvent migrate to an outer surface of the droplets and the conductive carrier at least partially encapsulates the gram-negative bacterium; contacting the charged spray of the feed mixture with a drying fluid to remove at least a portion of the solvent from the charged droplets of the feed mixture and to form the encapsulated microbial particulates; and recovering the encapsulated microbial particulates to form the microbial composition.

Other objects and features will be in part apparent and in part pointed out hereinafter.

DETAILED DESCRIPTION

Various microbial compositions are described herein. For example, in some embodiments, compositions comprise encapsulated microbial particulates comprising an aggregate comprising a bacterium, such as a gram-negative bacterium, and a carrier encapsulating at least a portion of the microbial aggregate. Various methods for preparing these microbial compositions are also described herein.

As used herein, the term "*Methylobacterium*" refers to genera and species in the methylobacteriaceae family, including bacterial strains in the *Methylobacterium* genus and the proposed *Methylorubrum* genus (Green and Ardley (2018)). *Methylobacterium* includes pink-pigmented facultative methylotrophic bacteria (PPFM) and also encompasses the non-pink-pigmented *Methylobacterium nodulans*, as well as colorless mutants of *Methylobacterium* isolates such as described herein. For example, and not by way of limitation, "*Methylobacterium*" refers to bacteria of the species listed below as well as any new species that have not yet been reported or described that can be characterized as *Methylobacterium* or *Methylorubrum* based on phylogenetic analysis.

"*Methylobacterium*" includes, but is not limited to: *Methylobacterium adhaesivum; Methylobacterium oryae; Methylobacterium aerolatum; Methylobacterium oxalidis; Methylobacterium aquaticum; Methylobacterium persicinum; Methylobacterium brachiatum; Methylobacterium phyllosphaerae; Methylobacterium brachythecii; Methylobacterium phyllostachyos; Methylobacterium bullatum; Methylobacterium platani; Methylobacterium cerastii; Methylobacterium pseudosasicola; Methylobacterium currus; Methylobacterium radiotolerans; Methylobacterium dankookense; Methylobacterium soli; Methylobacterium frigidaeris; Methylobacterium specialis; Methylobacterium fujisawaense; Methylobacterium tardum; Methylobacterium gnaphalii; Methylobacterium tarhaniae; Methylobacterium goesingense; Methylobacterium thuringiense; Methylobacterium gossipiicola; Methylobacterium trifolii; Methylobacterium gregans; Methylobacterium variabile; Methylobacterium haplocladi; Methylobacterium (Methylorubrum) aminovorans; Methylobacterium hispanicuum; Methylobacterium (Methylorubrum) extorquens; Methylobacterium indicum; Methylobacterium (Methylorubrum) podarium; Methylobacterium iners; Methylobacterium(Methylorubrum) populi; Methylobacterium isbiliense; Methylobacterium (Methylorubrum) pseudosasae; Methylobacterium jeotgali; Methylobacterium (Methylorubrum) rhodesianum; Methylobacterium komagalae; Methylobacterium (Methylorubrum) rhodinum; Methylobacterium longum; Methylobacterium (Methylorubrum) salsuginis; Methylobacterium marchantiae; Methylobacterium (Methylorubrum) suomiense; Methylobacterium mesophiicum; Methylobacterium (Methylorubrum) thiocyanatum; Methylobacterium nodulans; Methylobacterium (Methylorubrum) zatmanii;* and *Methylobacterium organophilum.*

As used herein, the term "strain" shall include all isolates of such strain.

To ensure the efficacy of a microbial composition it is critical to maintain a high level of viability of the bacteria in the composition during storage or any time prior to use. For some microbial compositions, viability (which can be quantified by the number of colony-forming units (CFU, cfu, or Cfu) of bacteria) decreases over the course of time. Also, variations in the preparation method and storage conditions, such as temperature, can also affect the viability of bacteria in some microbial compositions. Advantageously, various microbial compositions as described herein exhibit improved viability, particularly over prolonged and varied storage conditions.

It has been discovered that improved viability can be achieved by at least partially encapsulating microbial particulates with one or more of the carriers as described herein. Accordingly, in various embodiments, the microbial composition comprises encapsulated microbial particulates, wherein the encapsulated microbial particulates comprise an aggregate comprising a bacterium and a carrier encapsulating at least a portion of the microbial aggregate.

In some embodiments, the carrier comprises a conductive, water-soluble, and/or water-dispersible material. Also, suitable carriers can have a glass transition temperature in the range of from about 30° C. to about 120° C., from about 50° C. to about 120° C., from about 70° C. to about 120° C., from about 30° C. to about 100° C., from about 50° C. to about 100° C., from about 70° C. to about 100° C., from about 30° C. to about 80° C., from about 50° C. to about 80° C., or from about 70° C. to about 80° C.

In some embodiments, the carrier comprises at least one component selected from the group consisting of polyvinyl acetates, polyvinyl acetate copolymers, hydrolyzed polyvinyl acetates, polyvinylpyrrolidone, polyvinylpyrrolidone-vinyl acetate copolymer, polyvinyl alcohols, polyvinyl alcohol copolymers, polyvinyl methyl ether, polyvinyl methyl ether-maleic anhydride copolymer, waxes, latex polymers, celluloses including ethylcelluloses and methylcelluloses, hydroxy methylcelluloses, hydroxypropylcelluloses, hydroxymethylpropylcelluloses, carboxymethylcelluloses, polyvinyl pyrrolidones, alginates, dextrins, malto-dextrins, polysaccharides, proteins, karaya gum, jaguar gum, tragacanth gum, polysaccharide gums, mucilage, gum arabics, shellacs, vinylidene chloride polymers and copolymers, soybean-based protein polymers and copolymers, lignosulfonates, acrylic copolymers, starches, polyvinylacrylates, zeins, gelatin, chitosan, polyethylene oxide, acrylimide polymers and copolymers, polyhydroxyethyl acrylate, methylacrylimide monomers, alginate, polychloroprene, and mixtures thereof.

In some embodiments, the carrier comprises a saccharide compound. For example, the saccharide compound can comprise a polysaccharide. Polysaccharides comprise, for instance, a maltodextrin. Maltodextrin is a saccharide polymer that consists of D-glucose units linked primarily by [alpha]-1-4 bonds. Maltodextrins can be classified by dextrose equivalent (DE), which in some embodiments, ranges between 3 and 20, but can be higher, such as 30. Maltodextrins having a DE greater than 20 are also referred to as glucose syrups. A greater DE value indicates shorter glucose chains, higher water solubility, and lower heat resistance. In various embodiments, a maltodextrin as the carrier has a DE of from about 3 to about 30, from about 4 to about 30, from about 5 to about 30, from about 7 to about 30, from about 10 to about 30, from about 3 to about 20, from about 4 to about 20, from about 5 to about 20, from about 7 to about 20, from about 10 to about 20, from about 3 to about 17, from about 4 to about 17, from about 5 to about 17, from about 7 to about 17, from about 10 to about 17, from about 3 to about 15, from about 4 to about 15, from about 5 to about 15, from about 7 to about 15, from about 10 to about 15. In some embodiments, a maltodextrin as a carrier has a DE of from about 4 to about 7, from about 9 to about 15, from about 13 to about 25, from about 16 to about 20, or from about 18 to about 23.

In various embodiments, the maltodextrin is a mixture of these polymers (i.e., a mixture of maltodextrins having a range of DE values). For example, in some embodiments, a maltodextrin is a mixture of maltodextrins having a DE range of from about 4 to about 7, from about 8 to about 15, from about 13 to about 17, from about 16.5 to about 19.5.

In various embodiments, the carrier can comprise or further comprise an oligosaccharide. For example, the oligosaccharides can include various $C_5$ and/or $C_6$ sugar based oligosaccharides. In certain embodiments, the oligosaccharide is selected from the group consisting of fructo-oligosaccharides, galacto-oligosaccharides, mannan-oligosaccharides, isomalto-oligosaccharides, xylo-oligosaccharides, ribo-oligosaccharides, arabino-oligosaccharides, and mixtures thereof.

In further embodiments, the carrier can comprise or further comprise a sugar alcohol. In some embodiments, the sugar alcohol is selected from the group consisting of ethylene glycol, glycerol, erythritol, threitol, arabitol, xylitol, ribitol, mannitol, sorbitol, galactitol, fucitol, iditol, inositol, volemitol, isomalt, maltitol, lactitol, maltotriitol, maltotetraitol, polyglycitol, and mixtures thereof.

The carrier can be used in excess of the aggregate on a weight basis. In some instances, an excess amount of carrier advantageously provides for a greater degree of encapsulation. For example, the weight ratio of the carrier to the aggregate can be at least about 2:1, at least about 5:1, at least about 10:1, at least about 25:1, or at least about 50:1. In various embodiments, the weight ratio of the carrier to the aggregate is from about 5:1 to about 75:1, from about 10:1 to about 75:1, from about 25:1 to about 75:1, from about 50:1 to about 75:1, from about 5:1 to about 50:1, from about 10:1 to about 50:1, or from about 25:1 to about 50:1.

The encapsulated microbial particulates as described herein can be characterized by various particle size parameters. In various embodiments, the encapsulated microbial particulates are characterized by a particle size distribution where at least about 70%, at least about 80%, or at least about 90% of the particulates have a particle size (i.e., diameter of longest dimension) from about 2 microns to about 250 microns, from about 2 microns to about 200 microns, from about 2 microns to about 150 microns, from about 2 microns to about 100 microns, from about 2 microns to about 50 microns, about 10 microns to about 250 microns, from about 10 microns to about 200 microns, from about 10 microns to about 150 microns, from about 10 microns to about 100 microns, from about 10 microns to about 50 microns, about 20 microns to about 250 microns, from about 20 microns to about 200 microns, from about 20 microns to about 150 microns, from about 20 microns to about 100 microns, or from about 20 microns to about 50 microns.

In some embodiments, the encapsulated microbial particulates further comprise a solid insoluble filler to increase the percentage of solids in the encapsulated microbial particulates. In some embodiments, the solid filler is an inert solid. In some embodiments, the solid filler is a silica selected from the group consisting of halloysite, kaolinites, montmorillonite, talc, kyanite, sillimanite, andalusite, analcime, chabazite, clinoptilolite, heulandite, natrolite, phillipsite, stillbite, fumed silicas, precipitated silicas and micas.

In some embodiments, the encapsulated microbial particulates are characterized by an average particle size of from about 1 micron to about 500 microns, from about 1 micron to about 400 microns, from about 1 micron to about 300 microns, from about 1 micron to about 200 microns, from about 1 micron to about 100 microns, from about 10 microns to about 500 microns, from about 10 microns to about 400 microns, from about 10 microns to about 300 microns, from about 10 microns to about 200 microns, from about 10 microns to about 100 microns, from about 50 microns to about 500 microns, from about 50 microns to about 400 microns, from about 50 microns to about 300 microns, from about 50 microns to about 200 microns, or from about 50 microns to about 100 microns. Particle size parameters of the encapsulated microbial particulates can be characterized by analyzing one or more representative samples using laser diffraction techniques. Suitable laser diffraction particle size analyzers include, for example, Malvern Mastersizer instruments.

In some embodiments, the microbial composition has a low moisture content (particularly following preparation and before use). Accordingly, in various embodiments, the moisture content of the composition can be no greater than about 5 wt. %, no greater than about 4 wt. %, no greater than about 3 wt. %, no greater than about 2 wt. %, or no greater than about 1 wt. %. In some embodiments, the moisture content of the composition is from about 0.1 wt. % to about 5 wt. %, from about 0.1 wt. % to about 4 wt. %, about 0.1 wt. % to about 3 wt. %, about 0.1 wt. % to about 2 wt. %, about 0.1 wt. % to about 1 wt. %, from about 0.5 wt. % to about 5 wt. %, from about 0.5 wt. % to about 4 wt. %, about 0.5 wt. % to about 3 wt. %, about 0.5 wt. % to about 2 wt. %, about 0.5 wt. % to about 1 wt. %, from about 1 wt. % to about 5 wt. %, from about 1 wt. % to about 4 wt. %, about 1 wt. % to about 3 wt. %, or about 1 wt. % to about 2 wt. %.

The microbial composition can contain a range of bacteria. In some embodiments, the microbial composition comprises encapsulated microbial particulates comprising an aggregate comprising a gram-negative bacterium. In certain embodiments, the gram-negative bacterium comprises a bacterium sensitive to heat of temperatures of about 70° C. or greater, about 80° C. or greater, about 90° C. or greater, or about 100° C. or greater. In further embodiments, the aggregate comprises two or more different gram-negative bacteria species.

In various embodiments, the gram-negative bacterium comprises a *Methylobacterium*. In some embodiments, the *Methylobacterium* comprises a Pink Pigmented Facultative Methylotroph (PPFM). In some embodiments, the *Methylobacterium* is selected from the group consisting of *M. chloromethanicum, M. dichloromethanicum, M. fujisawaense, M. mesophilicum, M. organophilum, M. radiotolerans, M. cerastii, M. gossipiicola, Methylobacterium* sp. strain LMG6378, *M. phyllosphaerae, M. oryzae, M. platani*, and mixtures thereof. In certain embodiments, the *Methylobacterium* is selected from the group consisting of *M. aminovorans, M. extorquens, M. rhodesianum, M. rhodinum, M. thiocyanatum, M. popui, M. zatmanii*, and mixtures thereof.

In further embodiments, the *Methylobacterium* comprises *M. nodulans*.

In some embodiments, the aggregate comprises two or more different Methylobacteriaceae species.

In certain embodiments, the *Methylobacterium* isolates provided herein are disclosed in Table 1.

TABLE 1

| *Methylobacterium* isolates | |
| --- | --- |
| ISOLATE No. | USDA ARS NRRL No.[1] |
| ISO01 | NRRL B-50929 |
| ISO02 | NRRL B-50930 |
| ISO03 | NRRL B-50931 |
| ISO04 | NRRL B-50932 |
| ISO05 | NRRL B-50933 |
| ISO06 | NRRL B-50934 |
| ISO07 | NRRL B-50935 |
| ISO08 | NRRL B-50936 |
| ISO09 | NRRL B-50937 |
| ISO10 | NRRL B-50938 |
| ISO11 | NRRL B-50939 |
| ISO12 | NRRL B-50940 |
| ISO13 | NRRL B-50941 |
| ISO14 | NRRL B-50942 |
| ISO16 | NRRLB-67340 |
| ISO17 | NRRL B-67341 |
| ISO18 | NRRL B-67741 |
| ISO19 | NRRL B-67742 |
| ISO20 | NRRL B-67743 |
| ISO21 | NRRL B-67809 |
| ISO22 | NRRL B-67925 |
| ISO23 | NRRL B-67926 |
| ISO24 | NRRL B-67929 |
| ISO25 | NRRL B-67927 |
| ISO26 | NRRL B-67892 |

As noted, various microbial compositions described herein exhibit enhanced viability. Accordingly, in various embodiments, the microbial composition has a bacterium (e.g., gram-negative bacterium) titer of at least about $1 \times 10^9$ colony-forming units per gram.

Also, various microbial compositions described herein exhibit enhanced viability over prolonged storage. For example, in some embodiments, the microbial composition has a bacterium (e.g., gram-negative bacterium) titer of at least about $1 \times 10^4$ colony-forming units per gram after about 180 days following preparation of the composition. In some embodiments where the composition comprises Methylobacteriaceae, the composition can have a Methylobacteriaceae titer of at least about $1 \times 10^9$ colony-forming units per gram. In some embodiments, these compositions can have a Methylobacteriaceae titer of at least about $1 \times 10^4$ colony-forming units per gram after about 180 days following preparation of the composition.

As noted, in some embodiments, microbial compositions comprise encapsulated microbial particulates comprising an aggregate comprising a bacterium, such as a gram-negative bacterium (e.g., methanotrophs and/or methylotrophs), and a carrier encapsulating at least a portion of the microbial aggregate. In some embodiments, the aggregate further comprises a solid filler. In some embodiments, the solid filler is an inert solid. In some embodiments, the solid filler is a silica selected from the group consisting of halloysite, kaolinites, montmorillonite, talc, kyanite, sillimanite, andalusite, analcime, chabazite, clinoptilolite, heulandite, natrolite, phillipsite, stillbite, fumed silicas, precipitated silicas and micas. Features and characteristics mentioned above including, for example, the type of carrier, weight ratio of carrier to the microbial aggregate, moisture content, and bacterium can be independently adjusted or modified within the ranges described herein. Also, microbial compositions may be further defined according to features and characteristics and combinations of features and characteristics described herein. For example, in various embodiments, the microbial composition satisfies one of more of the following conditions: (a) the encapsulated microbial particulates are characterized by a particle size distribution where at least about 70%, at least about 80%, or at least about 90% of the particulates have a particle size from about 2 microns to about 250 microns; (b) the encapsulated microbial particulates are characterized by an average particle size of from about 1 microns to about 500 microns; or (c) the weight ratio of the carrier to the aggregate is from about 5:1 to about 75.1.

Some embodiments are directed to various methods for preparing microbial compositions. In some embodiments, the methods for preparing various microbial compositions described herein are believed to contribute to enhancing viability. During the production of various microbial compositions, bacteria are propagated in a fermentation broth, which includes a solvent (e.g., water) and other components such as nutrients. After the fermentation process is complete, the bacteria are in some embodiments, at least partially separated from the fermentation broth. Various techniques can be used for this separation process including, for example, filtration and/or centrifugation. Although the separation process is effective in producing an enriched fraction of bacteria, the fraction in some embodiments, contains an amount of solvent and possibly other components. To further enrich this fraction, an additional separation technique is needed. One further separation technique includes spray drying.

Generally, conventional spray drying involves atomizing the feed material and rapidly heating the atomized material to evaporate solvent and other volatile components. However, some bacteria are heat-sensitive. Thus, high temperatures encountered in conventional spray drying are not suitable for many heat-sensitive bacteria and can negatively affect the viability of a microbial composition.

As used herein, the terms atomize and atomization generally refer to the mechanical subdivision of a bulk medium (e.g., liquid or liquid/solid mixture) into droplets. One method of atomization involves flowing (e.g., pumping) the bulk medium through an atomizer or nozzle to form a spray of droplets.

It has been discovered that by employing certain electrostatic spray drying techniques, microbial compositions having improved viability can be prepared. In various embodiments, the methods for preparing a microbial composition comprise electrostatic spray drying of a feed mixture comprising a bacterium, a conductive carrier, and a solvent. For example, in some embodiments, the methods for preparing a microbial composition comprising encapsulated microbial particulates comprise atomizing a feed mixture comprising a bacterium (e.g., a gram-negative bacterium such as a methanotroph and/or methylotroph), a conductive carrier, and a solvent to form droplets of the feed mixture; electrostatically charging the droplets of the feed mixture to form a charged spray of the feed mixture wherein the conductive carrier and solvent migrate to an outer surface of the droplets and the conductive carrier at least partially encapsulates the bacterium; contacting the charged spray of the feed mixture with a drying fluid to remove at least a portion of the solvent from the charged droplets of the feed mixture and to form the encapsulated microbial particulates; and recovering the encapsulated microbial particulates to form the microbial composition.

In further embodiments, the methods for preparing a microbial composition comprising encapsulated microbial particulates comprise feeding a feed mixture comprising a bacterium (e.g., a gram-negative bacterium such as a methanotroph and/or methylotroph), a conductive carrier, and a solvent to an electrostatic spray drying stage comprising an atomization zone, a contact zone, and a collection zone; applying a voltage to an atomizer in the atomization zone; feeding the feed mixture through the atomizer to form a spray comprising charged droplets of the feed mixture wherein the conductive carrier and solvent migrate to an outer surface of the droplets and the conductive carrier at least partially encapsulates the bacterium; contacting the spray comprising charged droplets of the feed mixture with a drying fluid in the contact zone to remove at least a portion of the solvent from the charged droplets of the feed mixture and to form the encapsulated microbial particulates; and depositing the encapsulated microbial particulates in the collection zone and recovering the encapsulated microbial particulates to form the microbial composition.

In various embodiments of the foregoing methods, the feed mixture further comprises a solid insoluble filler. The presence of such a filler can increase the solids content of the feed mixture resulting in a more efficient spray drying process. Increasing the percentage of solids results in a lower liquid solvent content, thus lowering the heat requirement to remove the liquid during atomization. In some embodiments, the solid filler is an inert solid. In some embodiments, the solid filler is a silica selected from the group consisting of halloysite, kaolinites, montmorillonite, talc, kyanite, sillimanite, andalusite, analcime, chabazite, clinoptilolite, heulandite, natrolite, phillipsite, stillbite, fumed silicas, precipitated silicas and micas. In some embodiments, the presence of the solid filler improves the physical properties of the encapsulated microbial particulates and improves flowability during atomization and subsequent to the spray drying process.

In various embodiments, the drying fluid comprises a nitrogen-containing gas or air. In certain embodiments, the drying fluid has a moisture content of no greater than about 0.5 vol. %, no greater than about 0.1 vol. %, no greater than about 0.05 vol. %, or no greater than about 0.01 vol. % prior to contact with the charged spray of the feed mixture.

The drying fluid in various methods described herein can be introduced or fed (e.g., fed to the contact zone) at a relatively low temperature in comparison to temperatures encountered in conventional spray drying. In some embodiments, the drying fluid is at a temperature from about 50° C. to about 140° C., from about 50° C. to about 80° C., from about 70° C. to about 140° C., from about 80° C. to about 100° C., from about 100° C. to about 140° C. or from about 80° C. to about 90° C. prior to contact with the charged spray of the feed mixture (e.g., the temperature of the drying fluid at the inlet or upon introduction to the contact zone).

In various embodiments, the feed mixture is atomized with an atomizing fluid at a temperature from about 25° C. to about 60° C., from about 40° C. to about 60° C., from about 40° C. to about 50° C., or from about 50° C. to about 60° C. In some embodiments, the atomizing fluid comprises a gas having a nitrogen content of at least about 75 vol. %, at least about 80 vol. %, at least about 90 vol. %, at least about 95 vol. %, or at least about 99 vol. %.

The methods described herein are generally effective in removing solvent from the droplets of the feed mixture and preparing a microbial composition having a reduced solvent concentration. In various embodiments, the solvent comprises water. Accordingly, in some embodiments, the moisture content of the microbial composition is no greater than about 5 wt. %, no greater than about 4 wt. %, no greater than about 3 wt. %, no greater than about 2 wt. %, or no greater than about 1 wt. %. In certain embodiments, the moisture content of the composition is from about 0.1 wt. % to about 5 wt. %, from about 0.1 wt. % to about 4 wt. %, about 0.1 wt. % to about 3 wt. %, about 0.1 wt. % to about 2 wt. %, about 0.1 wt. % to about 1 wt. %, from about 0.5 wt. % to about 5 wt. %, from about 0.5 wt. % to about 4 wt. %, about 0.5 wt. % to about 3 wt. %, about 0.5 wt. % to about 2 wt. %, about 0.5 wt. % to about 1 wt. %, from about 1 wt. % to about 5 wt. %, from about 1 wt. % to about 4 wt. %, about 1 wt. % to about 3 wt. %, or about 1 wt. % to about 2 wt. %.

The carrier in some embodiments, comprises a conductive or polar carrier. In other words, the carrier comprises a material that is more conductive than the bacterium. In some embodiments, when the droplets of the feed material are electrostatically charged, the conductive carrier and solvent (which is also more polar than the bacterium) migrate to an outer surface of the droplets whereby the conductive carrier at least partially encapsulates the gram-negative bacterium while the solvent is evaporated.

As noted herein, in some embodiments, the suitable carriers can also have a glass transition temperature in the range of from about 30° C. to about 120° C., from about 50° C. to about 120° C., from about 70° C. to about 120° C., from about 30° C. to about 100° C., from about 50° C. to about 100° C., from about 70° C. to about 100° C., from about 30° C. to about 80° C., from about 50° C. to about 80° C., or from about 70° C. to about 80° C.

In some embodiments mentioned herein, the carrier comprises a saccharide compound, such as polysaccharide. In some embodiments, polysaccharides comprise, for instance, a maltodextrin as described herein. Further, in some embodiments, the maltodextrin can be a mixture of these polymers (i.e., a mixture of maltodextrins having a range of DE values) as discussed herein.

In various embodiments, the carrier can comprise or further comprise an oligosaccharide. For example, in some embodiments, the oligosaccharides can include various $C_5$ and/or $C_6$ sugar based oligosaccharides. In certain embodiments, the oligosaccharide is selected from the group consisting of fructo-oligosaccharides, galacto-oligosaccharides, mannan-oligosaccharides, isomalto-oligosaccharides, xylo-oligosaccharides, ribo-oligosaccharides, arabino-oligosaccharides, and mixtures thereof.

In further embodiments, the carrier can comprise or further comprise a sugar alcohol. In some embodiments, the sugar alcohol is selected from the group consisting of ethylene glycol, glycerol, erythritol, threitol, arabitol, xylitol, ribitol, mannitol, sorbitol, galactitol, fucitol, iditol, inositol, volemitol, isomalt, maltitol, lactitol, maltotriitol, maltotetraitol, polyglycitol, and mixtures thereof.

The carrier can be used in excess of the bacterium on a weight basis. In some embodiments, an excess amount of carrier advantageously provides for a greater degree of encapsulation. For example, the weight ratio of the carrier to the bacterium can be at least about 2:1, at least about 5:1, at least about 10:1, at least about 25:1, or at least about 50:1. In various embodiments, the weight ratio of the carrier to the aggregate is from about 5:1 to about 75:1, from about 10:1 to about 75:1, from about 25:1 to about 75:1, from about 50:1 to about 75:1, from about 5:1 to about 50:1, from about 10:1 to about 50:1, or from about 25:1 to about 50:1.

The methods described herein can be effective in preparing encapsulated microbial particulates having desirable particle size characteristics. In various embodiments, encapsulated microbial particulates can be prepared that are characterized by a particle size distribution where at least about 70%, at least about 80%, or at least about 90% of the particulates have a particle size (i.e., diameter of longest dimension) from about 2 microns to about 250 microns, from about 2 microns to about 200 microns, from about 2 microns to about 150 microns, from about 2 microns to about 100 microns, from about 2 microns to about 50 microns, about 10 microns to about 250 microns, from about 10 microns to about 200 microns, from about 10 microns to about 150 microns, from about 10 microns to about 100 microns, from about 10 microns to about 50 microns, about 20 microns to about 250 microns, from about 20 microns to about 200 microns, from about 20 microns to about 150 microns, from about 20 microns to about 100 microns, or from about 20 microns to about 50 microns.

In some embodiments, encapsulated microbial particulates can be prepared that are characterized by an average particle size of from about 1 micron to about 500 microns, from about 1 micron to about 400 microns, from about 1 micron to about 300 microns, from about 1 micron to about 200 microns, from about 1 micron to about 100 microns, from about 10 microns to about 500 microns, from about 10 microns to about 400 microns, from about 10 microns to about 300 microns, from about 10 microns to about 200 microns, from about 10 microns to about 100 microns, from about 50 microns to about 500 microns, from about 50 microns to about 400 microns, from about 50 microns to about 300 microns, from about 50 microns to about 200 microns, or from about 50 microns to about 100 microns. As noted, particle size parameters of the encapsulated microbial particulates can be characterized by analyzing one or more representative samples using laser diffraction techniques. Suitable laser diffraction particle size analyzers include, for example, Malvern Mastersizer instruments.

Methods described herein can be used for a wide range of bacteria. In some embodiments, the microbial composition comprises encapsulated microbial particulates comprising an aggregate comprising a gram-negative bacterium. In certain embodiments, the gram-negative bacterium comprises a bacterium sensitive to heat of temperatures of about 70° C. or greater, about 80° C. or greater, about 90° C. or greater, or about 100° C. or greater. In further embodiments, the aggregate comprises two or more different gram-negative bacteria species.

As discussed herein, in some embodiments, the methods described herein comprise a *Methylobacterium*. In some embodiments, the methods described herein comprise a PPFM. In certain embodiments, the methods described herein comprise a *Methylobacterium* selected from the group consisting of *M. chloromethanicum, M. dichloromethanicum, M. fujisawaense, M. mesophilicum, M. organophilum, M. radiotolerans, M. cerastii, M. gossipiicola, Methylobacterium* sp. strain LMG6378, *M. phyllosphaerae, M. oryzae, M. platani*, and mixtures thereof.

In various embodiments, wherein the gram-negative bacterium comprises a *Methylorubrum*. In some embodiments, the *Methylorubrum* comprises a Pink Pigmented Facultative Methylotroph (PPFM). In certain embodiments, the *Methylobacterium* is selected from the group consisting of *M. aminovorans, M. extorquens, M. rhodesianum, M. rhodinum, M. thiocyanatum, M. populi, M. zatmanii*, and mixtures thereof.

In further embodiments, the *Methylobacterium* comprises *M. nodulans*.

In some embodiments, the aggregate comprises two or more different Methylobacteriaceae species.

In some embodiments, the microbial compositions prepared by the methods described herein can exhibit enhanced viability. Accordingly, in various embodiments, microbial compositions prepared by the methods described herein can have a bacterium (e.g., gram-negative bacterium such as Methylobacteriaceae) titer of at least about $1\times10^9$ colony-forming units per gram. Also, microbial composition prepared by the methods described herein can exhibit enhanced viability over prolonged storage. For example, in some embodiments, the microbial composition prepared by the methods described herein can have a bacterium (e.g., gram-negative bacterium such as Methylobacteriaceae) titer of at least about $1\times10^4$ colony-forming units per gram after about 180 days following preparation of the composition.

In some embodiments, the composition or method disclosed herein may comprise one or more additional components. In some embodiments a second component can be an additional active ingredient, for example, a pesticide or a second biological. The pesticide may be, for example, an insecticide, a fungicide, an herbicide, or a nematicide. The second biological can be a biocontrol microbe.

Non-limiting examples of insecticides and nematicides include carbamates, diamides, macrocyclic lactones, neonicotinoids, organophosphates, phenylpyrazoles, pyrethrins, spinosyns, synthetic pyrethroids, tetronic and tetramic acids. In particular embodiments insecticides and nematicides include abamectin, aldicarb, aldoxycarb, bifenthrin, carbofuran, chlorantraniliporle, chlothianidin, cyfluthrin, cyhalothrin, cypermethrin, deltamethrin, dinotefuran, emamectin, ethiprole, fenamiphos, fipronil, flubendiamide, fosthiazate, imidacloprid, ivermectin, lambda-cyhalothrin, milbemectin, nitenpyram, oxamyl, permethrin, tioxazafen, spinetoram, spinosad, spirodichlofen, spirotetramat, tefluthrin, thiacloprid, thiamethoxam, and thiodicarb.

Non-limiting examples of useful fungicides include aromatic hydrocarbons, benzimidazoles, benzthiadiazole, carboxamides, carboxylic acid amides, morpholines, phenylamides, phosphonates, quinone outside inhibitors (e.g. strobilurins), thiazolidines, thiophanates, thiophene carboxamides, and triazoles. Particular examples of fungicides include acibenzolar-S-methyl, azoxystrobin, benalaxyl, bixafen, boscalid, carbendazim, cyproconazole, dimethomorph, epoxiconazole, fluopyram, fluoxastrobin, flutianil, flutolanil, fluxapyroxad, fosetyl-Al, ipconazole, isopyrazam, kresoxim-methyl, mefenoxam, metalaxyl, metconazole, myclobutanil, orysastrobin, penflufen, penthiopyrad, picoxystrobin, propiconazole, prothioconazole, pyraclostrobin, sedaxane, silthiofam, tebuconazole, thifluzamide, thiophanate, tolclofos-methyl, trifloxystrobin, and triticonazole.

Non-limiting examples of herbicides include ACCase inhibitors, acetanilides, AHAS inhibitors, carotenoid biosynthesis inhibitors, EPSPS inhibitors, glutamine synthetase inhibitors, PPO inhibitors, PS II inhibitors, and synthetic auxins, Particular examples of herbicides include acetochlor, clethodim, dicamba, flumioxazin, fomesafen, glyphosate, glufosinate, mesotrione, quizalofop, saflufenacil, sulcotrione, and 2,4-D.

In some embodiments, the compositions or methods disclosed herein may comprise an additional active ingredient which may be a second biological. The second biological could be a biological control agent, other beneficial microorganisms, microbial extracts, natural products, plant growth activators or plant defense agent. Non-limiting examples of biological control agents include bacteria, fungi, beneficial nematodes, and viruses.

In certain embodiments, the second biological can be Methylobacterium selected from the group consisting of ISO01 (NRRL B-50929), IS002 (NRRL B-50930), IS003 (NRRL B-50931), IS004 (NRRL B-50932), ISO05 (NRRL B-50933), IS006 (NRRL B-50934), IS007 (NRRL B-50935), IS008 (NRRL B-50936), IS009 (NRRL B-50937), ISO10 (NRRL B-50938), ISO11 (NRRL B-50939), ISO12 (NRRL B-50940), ISO13 (NRRL B-50941), ISO14 (NRRL B-50942), or ISO16 (NRRL-B-67340). In certain embodiments, the second biological can be a variant of derivative of a Methylobacterium isolate. As used herein, "variant" when used in the context of a Methylobacterium isolate, refers to any isolate that has chromosomal genomic DNA with at least 99%, 99.9%, 99.8%, 99.7%, 99.6%, or 99.5% sequence identity to chromosomal genomic DNA of a deposited Methylobacterium isolate provided herein. A variant of an isolate can be obtained from various sources including soil, plants or plant material, and water, particularly water associated with plants and/or agriculture. Variants include derivatives obtained from deposited isolates. Methylobacterium isolates or strains can be sequenced (for example as taught by Sanger et al. (1977), Bentley et al. (2008) or Caporaso et al. (2012)) and genome-scale comparison of the sequences conducted (Konstantinos et al. (2005)) using sequence analysis tools (for example, BLAST, as taught by Altschul et al. (1990)).

As used herein, "derivative" when used in the context of a Methylobacterium isolate, refers to any Methylobacterium that is obtained from a deposited Methylobacterium isolate provided herein. Derivatives of a Methylobacterium isolate include, but are not limited to, derivatives obtained by selection, derivatives selected by mutagenesis and selection, and genetically transformed Methylobacterium obtained from a Methylobacterium isolate. A "derivative" can be identified, for example based on genetic identity to the strain or isolate from which it was obtained and will generally exhibit chromosomal genomic DNA with at least 99%, 99.9%, 99.8%, 99.7%, 99.6%, or 99.5% sequence identity to chromosomal genomic DNA of the strain or isolate from which it was derived.

Accordingly, in some embodiments, the second biological can be Methylobacterium having chromosomal genomic DNA with at least 99%, 99.5%, 99.6%, 99.7%, 99.8%, or 99.9% or sequence identity to chromosomal genomic DNA of ISO01 (NRRL B-50929), IS002 (NRRL B-50930), IS003 (NRRL B-50931), IS004 (NRRL B-50932), ISO05 (NRRL B-50933), IS006 (NRRL B-50934), IS007 (NRRL B-50935), IS008 (NRRL B-50936), IS009 (NRRL B-50937), ISO10 (NRRL B-50938), ISO11 (NRRL B-50939), ISO12 (NRRL B-50940), ISO13 (NRRL B-50941), ISO14 (NRRL B-50942) or ISO16 (NRRL-B-67340).

In certain embodiments, the compositions and methods described herein can further comprise one or more introduced additional active ingredients or microorganisms of pre-determined identity other than Methylobacterium. In certain embodiments, the second biological can be a bacterium of the genus Actinomycetes, Agrobacterium, Arthrobacter, Alcaligenes, Aureobacterium, Azobacter, Beyerinckia, Brevibacillus, Burkholderia, Chromobacterium, Clostridium, Clavibacter, Comomonas, Corynebacterium, Curtobacterium, Enterobacter, Flavobacterium, Gluconobacter, Hydrogenophage, Klebsiella, Paenibacillus, Pasteuria, Phingobacterium, Photorhabdus, Phyllobacterium, Pseudomonas, Rhizobium, Bradyrhizobium. Serratia, Stenotrophomonas, Variovorax, and Xenorhadbus. In particular embodiments, the bacteria is selected from the group consisting of Bacillus amyloliquefaciens, Bacillus cereus, Bacillus firmus, Bacillus, lichenformis, Bacillus pumilus, Bacillus sphaericus, Bacillus subtilis, Bacillus thuringiensis, Chromobacterium suttsuga, Pasteuria penetrans, Pasteuria usage, and Pseudomonas fluorescens.

In certain embodiments, the second biological can be a fungus of the genus *Alternaria, Ampelomyces, Aspergillus, Aureobasidium, Beauveria, Colletotrichum, Coniothyrium, Gliocladium, Metarhisium, Muscodor, Paecilonyces, Trichoderma, Typhula, Ulocladium*, and *Verticilium*. In particular embodiments the fungus is *Beauveria bassiana, Coniothyrium minitans, Gliocladium vixens, Muscodor albus, Paecilomyces lilacinus*, or *Trichoderma polysporuim*.

In further embodiments, the second biological can be a plant growth activator or plant defense agent including, but not limited to harpin, Reynoutria sachalinensis, jasmonate, lipochitooligosaccharides, and isoflavones.

In further embodiments, the second biological can include, but is not limited to, various *Bacillus* sp., *Pseudomonas* sp., *Coniothyrium* sp., *Pantoea* sp., *Streptomyces* sp., and *Trichoderma* sp. Microbial biopesticides can be a bacterium, fungus, virus, or protozoan. Particularly useful biopesticidal microorganisms include various *Bacillus subtilis, Bacillus thuringiensis, Bacillus pumilis, Pseudomonas syringae, Trichoderma harzianum, Trichoderma virens*, and *Streptomyces lydicus* strains. Other microorganisms that are added can be genetically engineered or naturally occurring isolates that are available as pure cultures. In certain embodiments, it is anticipated that the bacterial or fungal microorganism can be provided in the fermentation broth, fermentation broth product, or composition in the form of a spore.

Features and characteristics mentioned above including, for example, the type of carrier, the drying fluid, temperature of the drying fluid, atomizing fluid, temperature of the atomizing fluid, moisture content, and type of bacterium can independently adjusted or modified within the ranges described herein.

Having described the invention in detail, it will be apparent that modifications and variations are possible without departing from the scope of the invention defined in the appended claims.

EXAMPLES

The following non-limiting examples are provided to further illustrate the present invention.

Example 1

The viability of bacteria in microbial compositions prepared using an electrostatic spray drying method was compared to spray drying (hot air) and freeze drying. Feed mixtures containing bacterial strain NLS0089 (USDA ARS No. NRRL B-50933) were dried using these three different techniques. Starting cell concentrations (whole broth) in cfu/ml for each of the separation techniques are described in Table 2 below. The feed mixture for the electrostatic spray drying contained approximately 8 wt. % cells and approximately 30 wt. % of a maltodextrin carrier having a dextrose equivalent of 18. The feed mixtures were atomized via an electrostatically charged nozzle (15,000 V) and nitrogen gas at approximately 140° C. to form a spray. The spray was contacted with dehumidified air that was fed to the electrostatic spray drying system. The temperature of the air that was fed to the system was either 90° C. or 140° C.

TABLE 2

| | Electrostatic Spray Drying | Spray Dry (Hot air) | Freeze Dry |
|---|---|---|---|
| Whole Broth Counts | 9.13E+10 | 1.44E+11 | 8.01E+10 |

Cells survived the high voltage (15,000 V) and pulse modulation needed to produce the agglomerated particles.

The number of colony forming units (cfu/g) across 550 days of storage at 25° C. and 40% relative humidity following the different preparations are shown in Table 3 (ND indicates that time point was not determined). Electrostatic spray drying showed a superior recovery and stability to freeze drying. In addition, freeze drying required the additional step of milling the product into a powder, which is not required for electrostatic spry drying. Further, it was observed that electrostatic spray drying mitigated some yield recovery and stability issues as compared to spray drying and freeze drying.

TABLE 3

| Days post-drying | Electrostatic Spray Drying | Spray Dry (Hot air) | Freeze Dry |
|---|---|---|---|
| 0 | 5.556E+10 | 1.44E+11 | 8.01E+10 |
| 5 | 7.687E+10 | 9.77E+10 | ND |
| 11 | 7.203E+10 | 8.14E+10 | 7.69E+10 |
| 14 | ND | ND | ND |
| 18 | ND | 4.15E+10 | 2.71E+10 |
| 21 | ND | ND | ND |
| 27 | ND | 4.35E+10 | 4.01E+10 |
| 33 | 6.281E+10 | 3.26E+10 | 4.15E+10 |
| 62 | 9.903E+10 | 1.40E+10 | ND |
| 74 | 8.523E+10 | ND | 1.36E+10 |
| 98 | 8.85E+10 | 1.32E+10 | ND |
| 123 | ND | ND | 1.22E+10 |
| 188 | 6.65E+10 | ND | 7.00E+09 |
| 216 | ND | ND | ND |
| 278 | ND | 2.00E+07 | ND |
| 305 | ND | ND | ND |
| 371 | 4.15E+10 | ND | ND |
| 547 | ND | ND | 6.03E+08 |

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and methods without departing from the scope of the invention, it is intended that all matter contained in the above description shall be interpreted as illustrative and not in a limiting sense.

REFERENCES

Green, P. N. 2005. *Methylobacterium* In Brenner, D. J., N. R. Krieg, and J. T. Staley (eds.). "Bergey's Manual of Systematic Bacteriology. Volume two, The Proteobacteria. Part C, The alpha-, beta-, delta-, and epsilonproteobacteria." Second edition. Springer, New York. Pages 567-571.

Green, P. N. 2006. *Methylobacterium*. In Dworkin, M., S. Falkow, E. Rosenberg, K.-H. Schleifer, and E. Stackebrandt (eds.). "The Prokaryotes. A Handbook on the Biology of Bacteria. Volume 5. Proteobacteria: Alpha and Beta Subclasses." Third edition. Springer, New York. Pages 257-265.

Lidstrom, M. E. 2006. Aerobic methylotrophic prokaryotes. In Dworkin, M., S. Falkow, E. Rosenberg, K.-H. Schleifer, and E. Stackebrandt (eds.). "The Prokaryotes. A Handbook on the Biology of Bacteria. Volume 2. Ecophysiology and biochemistry." Third edition. Springer, New York. Pages 618-634.

Sy, A., Giraud, E., Jourand, P., Garcia, N., Willems, A., De Lajudie, P., Prin, Y., Neyra, M., Gillis, M., Boivin-Masson, C., and Dreyfus, B. 2001. Methylotrophic *Methylobacterium* Bacteria Nodulate and Fix Nitrogen in Symbiosis with Legumes. Jour. Bacteriol. 183(1):214-220.

The invention claimed is:

1. A method for preparing a microbial composition comprising encapsulated microbial particulates, the method comprising:

atomizing a feed mixture comprising a gram-negative bacterium, a conductive carrier, and a solvent via an electrostatically charged nozzle to form a charged spray of the feed mixture wherein the conductive carrier and solvent migrate to an outer surface of the droplets and the conductive carrier at least partially encapsulates the gram-negative bacterium;

contacting the charged spray of the feed mixture with a drying fluid to remove at least a portion of the solvent from the charged droplets of the feed mixture and to form the encapsulated microbial particulates; and recovering the encapsulated microbial particulates to form the microbial composition, wherein the composition has a gram-negative bacterium titer of at least about $1\times10^4$ colony-forming units per gram after about 180 days following preparation of the composition.

2. The method of claim 1, wherein the drying fluid comprises a nitrogen-containing gas or air.

3. The method of claim 1, wherein the drying fluid is at a temperature from about 50° C. to about 140° C., from about 50° C. to about 80° C., from about 70° C. to about 140° C., from about 80° C. to about 100° C., from about 100° C. to about 140° C. or from about 80° C. to about 90° C. prior to contact with the charged spray of the feed mixture.

4. The method of claim 1, wherein the feed mixture is atomized with an atomizing fluid at a temperature from about 25° C. to about 60° C., from about 40° C. to about 60° C., from about 40° C. to about 50° C., or from about 50° C. to about 60° C.

5. The method of claim 1, wherein the moisture content of the composition is no greater than about 5 wt. %, no greater than about 4 wt. %, no greater than about 3 wt. %, no greater than about 2 wt. %, or no greater than about 1 wt. %.

6. The method of claim 1, wherein the weight ratio of the carrier to the bacterium is at least about 2:1, at least about 5:1, at least about 10:1, at least about 25:1, or at least about 50:1.

7. The method of claim 1, wherein the carrier has a glass transition temperature in the range of from about 30° C. to about 120° C., from about 50° C. to about 120° C., from about 70° C. to about 120° C., from about 30° C. to about 100° C., from about 50° C. to about 100° C., from about 70° C. to about 100° C., from about 30° C. to about 80° C., from about 50° C. to about 80° C., or from about 70° C. to about 80° C.

8. The method of claim 1, wherein the carrier comprises a saccharide compound.

9. The method of claim 8, wherein the saccharide compound is a polysaccharide.

10. The method of claim 9, wherein the polysaccharide comprises maltodextrin.

11. The method of claim 1, wherein the gram-negative bacterium is a *Methylobacterium* or *Methylorubrum*.

12. The method of claim 2, wherein the heated drying fluid comprises a nitrogen-containing gas or air at a temperature of about 100° C. to about 140° C. prior to contact with the charged spray of the feed mixture.

13. The method of claim 1, wherein the gram-negative bacterium comprises a methanotroph and/or a methylotroph.

14. The composition of claim 10, wherein the maltodextrin has a dextrose equivalent of from about 13 to about 25.

* * * * *